(12) United States Patent
Silagy

(10) Patent No.: US 6,267,280 B1
(45) Date of Patent: Jul. 31, 2001

(54) STRAP CUSHIONING PAD AND LACING METHOD OF ATTACHMENT

(76) Inventor: Howard Silagy, 100A Tec St., Hicksville, NY (US) 11801

( * ) Notice: Subject to any disclaimer, the term of this patent is extended or adjusted under 35 U.S.C. 154(b) by 0 days.

(21) Appl. No.: 09/556,988

(22) Filed: Apr. 24, 2000

(51) Int. Cl.$^7$ .............................. A41F 15/00; A45F 3/12; B60R 22/28

(52) U.S. Cl. .............................. 224/264; 2/268; 280/808; 297/482

(58) Field of Search .............................. 297/482; 2/268; 280/808; 224/264, 643

(56) References Cited

U.S. PATENT DOCUMENTS

| | | | |
|---|---|---|---|
| 2,699,550 | * | 1/1955 | Freid .......................................... 2/268 |
| 3,788,308 | * | 1/1974 | Simpson .............................. 224/264 |
| 3,799,413 | * | 3/1974 | McBain ................................. 224/264 |
| 3,957,282 | * | 5/1976 | Finnigan ............................... 280/808 |
| 4,401,246 | * | 8/1983 | Dickinson et al. .................... 224/264 |
| 4,754,858 | * | 7/1988 | Robinson .............................. 224/264 |
| 4,887,318 | * | 12/1989 | Weinreb ............................... 224/264 |
| 5,173,964 | * | 12/1992 | Ball et al. ................................. 2/267 |
| 5,377,573 | * | 1/1995 | Tretick .................................... 84/280 |
| 5,620,234 | * | 4/1997 | Gunby ................................... 297/482 |
| 5,803,792 | * | 9/1998 | Roush et al. ............................. 2/267 |
| 5,911,479 | * | 6/1999 | Atkinson ............................... 297/482 |

* cited by examiner

*Primary Examiner*—Stephen P. Garbe
(74) *Attorney, Agent, or Firm*—Myron Amer PC

(57) ABSTRACT

An elastomeric shoulder pad to serve as a buffer between an over-the-shoulder carrying strap and a user's shoulder in which lacing openings, similar to those used in footwear, are provided in a top surface of the shoulder pad and the carrying strap seated in a recess between the lacing openings and laced in place, so that the shoulder pad in use is in an interposed position between the carrying strap and the user's shoulder.

3 Claims, 1 Drawing Sheet

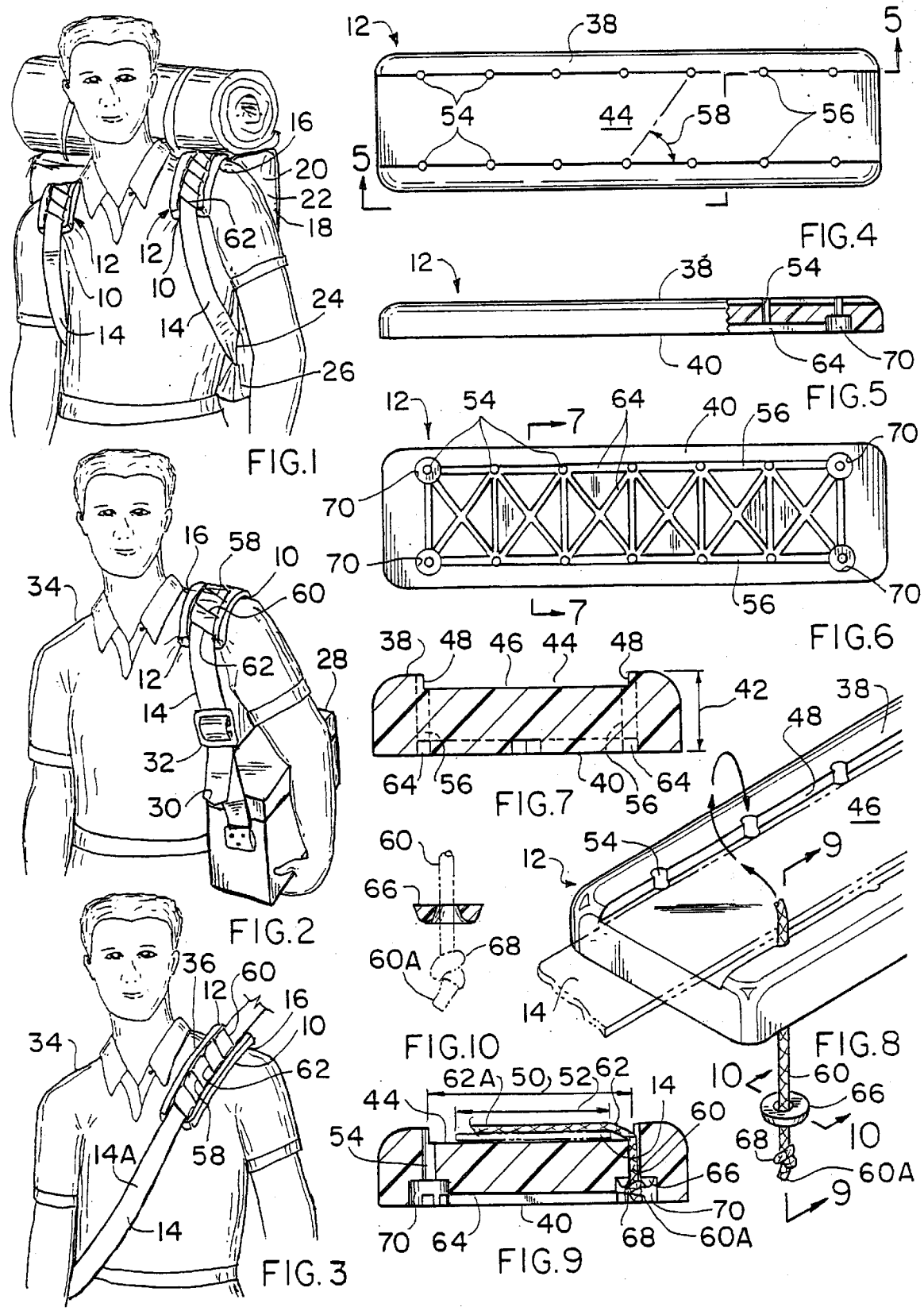

STRAP CUSHIONING PAD AND LACING METHOD OF ATTACHMENT

The present invention relates generally to improvements in elastomeric shoulder pads used to buffer the weight of an over-the-shoulder shoulder strap of a knapsack or similar article of manufacture, the improvement more particularly facilitating the placement of the shoulder pad in an interposed position between the strap and the user's shoulder.

EXAMPLE OF THE PRIOR ART

It is known from common experience, as well as from prior patents, as exemplified by U.S. Pat. No. 4,887,318 for "Shoulder Pad" issued to Weinreb on Dec. 19, 1989, that the weight load on a shoulder can result in discomfort and is readily relieved using a rubber or elastomeric shoulder pad. However, the positioning of the pad under the strap and holding a position of the pad, which optimally should be at the change in curvature of the shoulder, has not entirely been satisfactorily solved in the prior art. In the '318 patent, laterally extending tabs described as integral at one end to the pad and connected at free ends to form closed loops encircling the strap is the positioning technique used since the ends of the strap involved are attached to the carriage article and thus not able to otherwise be assembled to the pad. Since the construction material of the pad is elastomeric, manufacturing techniques are required to achieve an integrated attachment of the tab ends that will withstand the normal abuse of the attaching and detaching of the tabs.

Broadly, it is an object of the present invention to provide a shoulder pad overcoming the foregoing and other shortcomings of the prior art.

More particularly, it is an object to provide a simplified and more effective manner of assembling the shoulder pad to an over-the-shoulder carrying strap, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a perspective view of a shoulder pad according to the present invention applied to shoulder straps of a weight-carrying knapsack article of manufacture;

FIG. 2 is a view similar to FIG. 1 but illustrating an application to another weight-carrying article of manufacture;

FIG. 3 is also similar to FIG. 1, but illustrating an application to still another article of manufacture;

FIG. 4 is an isolated plan view of the shoulder pad;

FIG. 5 is a side elevational view of the shoulder pad as seen along line 5—5 of FIG. 4;

FIG. 6 is an isolated bottom view of the shoulder pad;

FIG. 7 is a cross sectional view of the shoulder pad as taken along line 7—7 of FIG. 6;

FIG. 8 is a partial perspective view illustrating the application of a lacing pattern according to the present invention to the shoulder pad;

FIG. 9 is a view of the lacing pattern of FIG. 8 as taken along line 9—9 of FIG. 8; and FIG. 10 is an isolated view partially in phantom perspective, of an aspect of the lacing pattern and as seen along line 10—10 of FIG. 8.

It is known by common experience that to serve as a buffer and to distribute from a localized to a greater area supported weight, it is desirable to interpose, as at 10, a shoulder pad 12 of elastomeric construction material between a shoulder strap 14 and a user's shoulder 16.

If the supported weight 18 is constituted of typical objects stored in a compartment 20 of knapsack 22 article of manufacture (FIG. 1), the user's options to apply the shoulder pad 16 are limited. As an OEM (original equipment manufacture), the knapsack 22 has left and right shoulder straps 14 with opposite ends attachably sewn, as at 24, to the body 26 of the knapsack 22. As a consequence, one end of a strap 14 must be detached, threaded through a sleeve of a prior art shoulder pad, and then sewn back at the site of detachment.

Another option for the OEM support straps 14 is to use a prior art shoulder pad with laterally extending flaps integral with the pad at one end and at cooperating free ends connected in overlapping relation to each other using VEL-CRO hook and loop connectors to form a closed loop in encircling relation about the prior art strap. Allowing however, that the construction material of the prior art pad is elastomeric, there are difficult manufacturing techniques required in making the laterally extending ends of the flaps integral with the body of the shoulder pad sufficient to withstand the normal abuse of use.

In another contemplated end use, as depicted in FIG. 2 illustrating a different article of manufacture for weight carriage, as exemplified by a tool kit 28 but which will be understood to also include a fabric and/or canvas bag functionally similar to the tool kit 28 and thus understood to be denoted by the same reference number, there is more of a likelihood of the OEM carriage unit 28 having an over-the-shoulder carrying strap 14 having an unattached end 30 with a buckle 32 to configurate the strap into a closed loop for positioning over the shoulder 16 of the user 34. The sleeve of the prior art pad, assuming the exercise of the second option previously described, must be oversized in width in relation to the width of the strap threaded therethrough in order provide threading clearance, and this clearance results in inadvertent sliding of the shoulder pad from an optimum position to serve as a buffer to a lesser position to achieve its intended end purpose.

The end use depicted in FIG. 3 is of another example of a strap without a free end, namely an angularly oriented strap length portion 14A of a driver's safety belt 14 which, as illustrated, benefits from the application of a shoulder pad 12 at the clavicle 36 of the user 34.

The application of the FIGS. 1, 2 and 3 circumstances, and in all other known circumstances of a similar nature, is readily achieved using the shoulder cushioning pad 12, as will now be described in detail in connection with FIGS. 4–10, inclusive. Pad 12 in a rectangular shape has a top surface 38, a bottom surface 40, delimiting therebetween a thickness 42. Centrally in the top surface 38 either in the molding or other fabrication of the elastomeric construction material of the pad 12, there is a recess 44 bounded by a bottom wall 46 and opposite spaced apart side walls 48, the distance 50 between the sides 48 being only slightly oversized with respect to the width 52 of the strap 14 which seats in the recess. At least partially, in the full thickness length portions 42 bordering the recess 48 there is provided in an appropriate manner plural lacing openings, individually and collectively designated 54, arranged in two rows 56 and at an angular orientation as noted at 58 of the type typically used to lace up footwear, except that the openings 54 hereof are not reinforced as by eyelets used for footwear, since such reinforcement is only optional and not essential.

A selected length of lace 60 is threaded through the openings 54, one lacing step being depicted best in FIG. 9, resulting in a lacing pattern characterized by helical turns, individually and collectively designated 62, in overlying relation over the recess 44. Lace-receiving channels in the pad bottom surface 40, individually and collectively designated 64 receive in full projected relation therein the lace 60 extending across from one side row 56 to the other side row 56, so that there is no lace protrusion that could contribute to any discomfort at the interface of the pad bottom surface 40 and the shoulder 16.

In contemplation of the lacing attachment of the pad 12, the strap 14 is, of course, seated in the recess 44, using a location on the strap 14 that is coincident to the change in curvature of the user's shoulder 16.

As best understood from FIGS. 8, 9 and 10, the lace 60 is cut to size needed for the lacing pattern 62A, an end 60A threaded through an anchor ring 66 and knotted at 68, the threading of the lacing pattern 62A resulting in strap encircling helical turns 62 and, as a finishing step the application of another anchor ring 66 inwardly adjacent a lacing knotted end 68. For completeness' sake, it is noted that the anchor rings 66 are seated in recesses 70 to maintain the smooth to the feel nature of the bottom surface 40 of the shoulder cushion pad 12.

In practice, good results have been achieved using an elastomeric shoulder pad 12 that is 11 inches long, 3 inches wide, ¾ inches thick, and with 7 openings 54 in each row 56, and an angular orientation 58 subtending an angle of 50 degrees.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In preparing for manual transportation an over-the-shoulder carrying strap of a knapsack-type article of manufacture during which a shoulder pad is provided with an interposed position between a shoulder of a user and said strap so as to serve as a load-distributing buffer, an improvement consisting of a method of facilitating said providing of said interposed position comprising the steps of:

1. fabricating said shoulder pad of elastomeric construction material in a rectangular shape having a top surface and a bottom surface and a thickness delimited therebetween;
   2. recessing into said thickness of said top surface only centrally and longitudinally thereof and leaving intact opposite full thickness left and right borders;
   3. seating a length portion of said over-the-shoulder strap in said shoulder pad recess in an as yet unattached condition thereto;
   4. using a length of lacing and longitudinally spaced lacing openings in said left and right borders; and
   5. lacing a pattern of plural helical turns of said lacing in said lacing openings in encircling relation about said top and bottom surfaces of said shoulder pad with said strap in said recess;

whereby while keeping intact said seated position of said strap within said recess said unattached condition of step 3 is readily modified to a completed condition using said lacing pattern, to thereby hold in place said shoulder pad in said interposed position to serve as a buffer.

2. In combination, a knapsack using a carrying strap to be manually transported, and added in an interposed position between a shoulder of a user thereof and said carrying strap a shoulder cushioning pad to serve as a load distributing buffer, said shoulder cushioning pad comprising a body of elastomeric construction material in a rectangular shape having a top surface and a bottom surface and a thickness delimited therebetween, said top surface only centrally and longitudinally thereof having a recess into said thickness and leaving intact opposite full thickness left and right borders, a selected length of lacing, said left and right borders of said recess having longitudinally oriented and spaced apart lacing openings therein, said carrying strap having an operative position of a length portion thereof coincident to a shoulder of a user disposed physically unattached in said recess, and said selected length of lacing having an operative position in said lacing openings effective to provide a lacing pattern of plural helical turns in encircling relation about said top and bottom surfaces of said shoulder pad with said strap in said recess, to thereby hold in place said shoulder pad in said interposed position to serve as a buffer.

3. In combination, an auto driver's safety belt having an angularly oriented length portion extending from a position adjacent a user's clavicle across said user's chest, and added in an interposed position between said clavicle of said user and said strap a cushioning pad to serve as a load distributing buffer, said cushioning pad comprising a body of elastomeric construction material in a rectangular shape having a top surface and a bottom surface and a thickness delimited therebetween, said top surface only centrally and longitudinally thereof having a recess into said thickness and leaving intact opposite full thickness left and right borders, a selected length of lacing, said left and right borders of said recess having longitudinally oriented and spaced apart lacing openings therein, said strap having an operative position of a length portion thereof coincident to a clavicle of a user disposed physically unattached in said recess, and said selected length of lacing having an operative position in said lacing openings effective to provide a lacing pattern of plural helical turns in encircling relation about said top and bottom surfaces of said shoulder pad with said strap in said recess, to thereby hold in place said cushioning pad in said interposed position to serve as a buffer.

\* \* \* \* \*